United States Patent [19]

Stenuick

[11] 4,241,800
[45] Dec. 30, 1980

[54] CUTTING TOOL FOR A PNEUMATIC HAMMER

[75] Inventor: Pierre Stenuick, Fontaine l'Eveque, Belgium

[73] Assignee: Stenuick Freres S.A., Fontaine l'Eveque, Belgium

[21] Appl. No.: 22,997

[22] Filed: Mar. 22, 1979

[30] Foreign Application Priority Data

Apr. 24, 1978 [FR] France .................. 78 12012

[51] Int. Cl.³ ............................................. E21B 9/02
[52] U.S. Cl. ................................... 175/400; 175/417
[58] Field of Search .............. 175/400, 414, 417, 418; 173/80

[56] References Cited

U.S. PATENT DOCUMENTS

| | | | |
|---|---|---|---|
| 1,660,201 | 2/1928 | Lee ........................................ 175/418 |
| 3,986,565 | 10/1976 | Aktinson ............................... 173/80 |
| 3,991,834 | 11/1976 | Cunington ............................ 173/80 |
| 4,079,793 | 3/1978 | Mosely et al. ........................ 173/80 |

*Primary Examiner*—James A. Leppink
*Attorney, Agent, or Firm*—Haseltine and Lake

[57] ABSTRACT

A cutting tool for a pneumatic hammer operative at the bottom of a hole comprising a head for supporting cutting bits and a tail of reduced diameter extending from the head and provided with grooves forming alternating asymmetrical teeth engageable in symmetrical grooves provided in the interior of the front cylinder of the hammer. Each tooth of the cutting tool has a working flank in contact with the hammer during drilling which is of greater height than the other flank of the tooth so that each asymmetrical tooth can define in the symmetrical groove of the hammer an escape channel for compressed air from the hammer.

5 Claims, 3 Drawing Figures

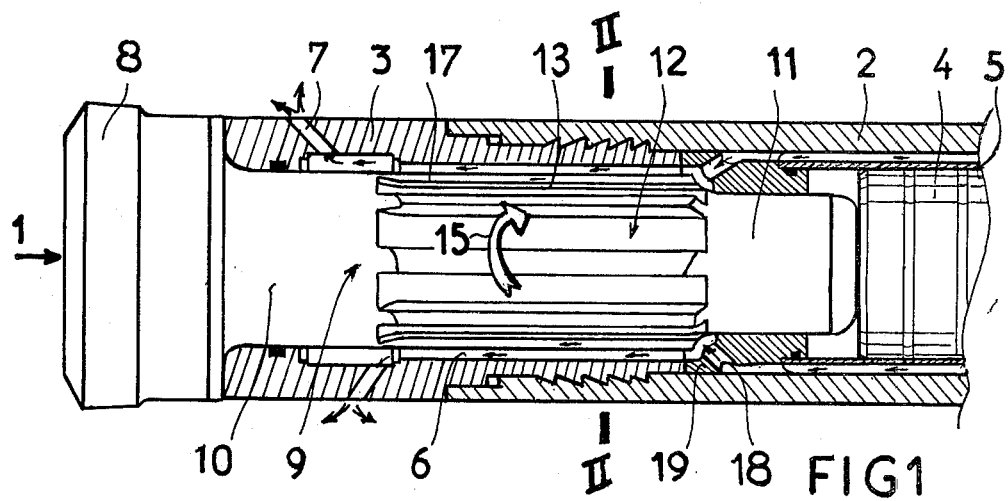
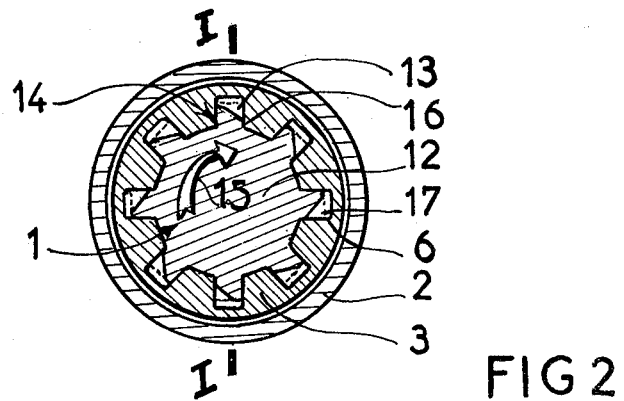
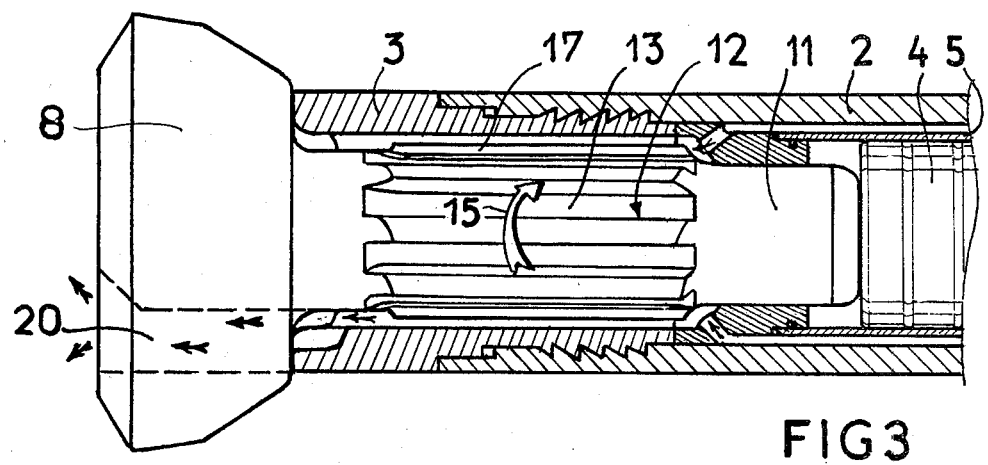

CUTTING TOOL FOR A PNEUMATIC HAMMER

FIELD OF THE INVENTION

The present invention relates to a cutting tool for a pneumatic hammer operating at the bottom of a hole.

BACKGROUND

The guiding of a cutting tool in the tube of a pneumatic hammer is achieved conventionally by the provision of grooves in the inner surface of the tube which are engaged by corresponding teeth formed on a tail of reduced diameter on the tool engaged in the tube.

However, excessive wear has been found in the grooves of hammers utilizing cutting tools of large diameter while additionally abnormal wear has been found on the teeth of the grooved portion of the cutting tool.

In order to overcome these disadvantages, one solution consisted of increasing the drive surface of the hammer with the cutting tool by increasing either the length or the height of the teeth of the cutting tool.

However, the increase of the length of the grooved portion of the cutting tool has the disadvantage of increasing the tail of the cutting tool, thus increasing the cost and fragility thereof.

Furthermore, it was found beneficial to provide a space between the teeth of the cutting tool and the corresponding grooves in the hammer in order to form escape channels for the compressed air from the hammer. However, if the wear of the teeth of the cutting tool and the grooves of the hammer is obtained by increasing the height of the teeth of the cutting tool, it then becomes impossible to utilize the space between the teeth of the cutting tool and the grooves of the hammer as escape channels. In effect, the increase in the height of the teeth of the cutting tool diminishes the section of the channels and produce a constriction of the hammer leading to an unfavorable reduction of speed.

SUMMARY OF THE INVENTION

An object of the invention is to provide a construction of the cutting tool and hammer which avoids the above disadvantages.

A specific object of the invention is to provide a construction of the cutting tool and hammer which permits reduction of the wear of the cutting tool and the hammer while permitting the escape of compressed air through the channels formed between the teeth of the cutting tool and the grooves in the front cylinder of the hammer.

In fact, it is found that the wear of the teeth of the cutting tool is produced, for each tooth, on the flank which is in contact with interior of the front cylinder of the hammer during the drilling operation. As a consequence, to reduce the wear of the teeth by increasing the area of the drive surface of the cutting tool by the hammer, it is sufficient to increase, for each tooth, the height of the flank of the tooth which is in contact with the front cylinder of the hammer during the drilling. It will be seen that this is achieved by the present invention.

More specifically, the present invention is applicable to a cutting tool for a pneumatic hammer operative at the bottom of a hole and comprises a head for supporting the cutting bits and a tail of reduced diameter of which at least a portion is provided with grooves to form teeth engageable in symmetrical grooves formed in the inner surface of the front cylinder of the hammer.

According to the invention, the teeth of the grooved portion of the cutting tool are asymmetrical, the height of the front of cylinder of the flank of each tooth which is in contact with the hammer during the drilling being greater than the height of the other flank. These teeth thus define with the symmetrical grooves in the front cylinder of the hammer, escape channels for compressed air.

The invention is also directed to a hammer incorporating such a cutting tool.

In a preferred embodiment of the invention, the escape channels are prolonged in the head of the cutting tool by longitudinal holes directing the air to the bottom of the hole formed in the ground.

The invention will be described in greater detail hereafter with reference to two specific embodiments given by way of example and illustrated in the attached drawing.

BRIEF DESCRIPTION OF THE SEVERAL VIEWS OF THE DRAWING

FIG. 1 is an axial longitudinal sectional view taken along lines I—I in FIG. 2 of a portion of a pneumatic hammer provided with a cutting tool according to the invention.

FIG. 2 is a transverse sectional view taken along line II—II in FIG. 1.

FIG. 3 is a view similar to FIG. 1 of another embodiment according to the invention.

DETAILED DESCRIPTION

FIGS. 1 and 2 show a cutting tool 1 engaged in the front cylinder at the extremity of a hammer. The hammer comprises a sleeve 2 at the end of which a front cylinder 3 is threadably engaged. The interior of the sleeve 2 comprises a mechanism for distribution of compressed air adapted to control the movement of a striker 4 acting on the extremity of the cutting tool 1. The striker 4 slides in a sleeve 5 inside the sleeve 2.

The interior of the front cylinder 3 is provided over a portion of its length with grooves 6. The front cylinder 3 is also provided with orifices 7 which serve for escape of compressed air from the hammer.

The cutting tool 1 is constituted by a head 8 for the mounting of cutting bits (not shown) and a tail 9 of reduced diameter. The tail 9 includes three portions 10, 11, 12. The portions 10 and 11 are cylindrical. The portion 10 is situated adjacent the head 8 and the portion 11 is situated at the extremity of the tail of the cutting tool. The intermediate portion 12 is provided with longitudinal grooves forming alternating teeth 13. The teeth 13 are asymmetrical. Each tooth 13 comprises working flank 14 which is in contact with the interior of the front cylinder 3 during the drilling operation (the arrow 15 shows the direction of rotation of the assembly of the hammer and the cutting tool). The height of flank 14 is greater than the height of the other flank 16 of the tooth 13. In fact, the flank 16 which is not in contact with the front cylinder 3 during the drilling does not constitute a drive surface of the cutting tool by the hammer. The height of flank 16 therefore need not be substantial. FIG. 2 shows in dotted lines the shape of a symmetrical tooth in which the height of the two flanks would be equal.

The teeth 13 and the corresponding grooves 6 of the front cylinder of the hammer define channels 17. The channels permit compressed air to escape during the drilling. The compressed air then flows along the following path: it passes between sleeve 2 and the sleeve 5, then through bores 18 formed in crosspiece 19, then through escape channels 17 and finally through orifices 7 which direct the air towards the bottom of the drilled hole.

In FIG. 3, the path of the compressed air is slightly different from that just described. In fact, at the outlet of channels 17, the air does not escape through orifices formed in the front cylinder, but through escape channels 20 provided in the head 8 of the cutting tool. The escape channels 20 extend longitudinally and direct the air towards the bottom of the drilled hole.

For the embodiment of FIG. 3, a transverse section has not been shown as for the embodiment in FIG. 1. In effect, the transverse section is similar to that in FIG. 2.

The cutting tool according to the invention has a number of advantages. It permits reduction in the wear of the teeth of the tail of the cutting tool and, correspondingly, wear of the grooves formed in the interior of the front cylinder. There is thus achieved a great economy by avoiding the need for frequent replacement of the cutting tool.

Another advantage of the invention resides in the fact that the compressed air can escape through the channels defined between the teeth of the cutting tool and the grooves in the hammer. This permits a simple flow of the air. Furthermore, this simplifies the construction of the front cylinder. In effect, in accordance with the invention, it is not necessary to provide special holes for the escape of air as in conventional hammers. In fact, by forming the grooves in the interior of the front cylinder, there is achieved both the apparatus for mounting and guiding the cutting tool and the escape channels for the compressed air. The manufacture of such front cylinder is therefore simple.

Of course, the invention is not strictly limited to the embodiments which have been described by way of example, but it covers embodiments which are distinguished only by details, by variations of execution, or by the utilization of equivalent means. Thus, the number of teeth of the cutting tool can be varied. Their shape can also be modified. For example, a cutting tool can be provided having grooves with involute flanks.

What is claimed is:

1. A cutting tool adapted to fit in the front cylinder of a pneumatic hammer operative at the bottom of a hole, comprising a head for supporting cutting bits, and a tail of reduced diameter extending from said head, said tail being provided with grooves forming alternating teeth adapted for engaging in symmetrical grooves provided in the interior of the front cylinder of the hammer, each said tooth being asymmetrical by virtue of having a working flank in contact with the front cylinder of the hammer during drilling which is of greater height than the other flank of the tooth, said asymmetrical tooth defining in a corresponding symmetrical groove in the interior of the front cylinder of the hammer an escape channel for compressed air from the hammer.

2. A cutting tool as claimed in claim 1 wherein said head is provided with orifices extending to said escape channels for outflow of the compressed air from the cutting tool.

3. A cutting tool as claimed in claim 1 wherein said head is provided with longitudinal bores extending to said escape channels for outflow of the compressed air towards the bottom of the hole being drilled.

4. A pneumatic hammer for drilling holes in the ground comprising a cutting tool as claimed in claim 1.

5. A pneumatic hammer as claimed in claim 4 comprising an end portion which is provided with orifices extending to said escape channels for discharge of compressed air therefrom.

* * * * *